United States Patent
Minetz

(10) Patent No.: US 8,636,258 B2
(45) Date of Patent: Jan. 28, 2014

(54) CRANIUM STAND

(76) Inventor: Jolen Anya Minetz, Paxton, IL (US)

(\*) Notice: Subject to any disclaimer, the term of this patent is extended or adjusted under 35 U.S.C. 154(b) by 0 days.

(21) Appl. No.: 12/973,892

(22) Filed: Dec. 20, 2010

(65) Prior Publication Data

US 2012/0153115 A1    Jun. 21, 2012

(51) Int. Cl.
*F16M 11/32* (2006.01)
(52) U.S. Cl.
USPC ............ 248/440; 248/176.1; 248/465.1; 248/440.1; 5/637; 602/17
(58) Field of Classification Search
USPC ........ 248/440, 304, 309.2, 303, 440.1, 176.1, 248/431, 173, 179.1, 465, 465.1; 5/622, 5/637, 640; 602/17, 18
See application file for complete search history.

(56) References Cited

U.S. PATENT DOCUMENTS

| | | | |
|---|---|---|---|
| 366,833 A | 7/1887 | Hipwell | |
| 2,273,575 A | 2/1942 | Hurlbut | |
| 2,507,172 A * | 5/1950 | Naclerio | 5/622 |
| 2,710,733 A * | 6/1955 | Phillips | 248/431 |
| 2,841,352 A | 7/1958 | Pappas | |
| 3,276,734 A * | 10/1966 | Goldblatt | 248/176.1 |
| D238,377 S | 1/1976 | Allen | |
| 4,378,100 A * | 3/1983 | Minozzi et al. | 248/168 |
| 4,504,050 A * | 3/1985 | Osborne | 5/637 |
| 4,620,697 A * | 11/1986 | Pithon | 5/640 |
| 4,652,047 A * | 3/1987 | Chan | 297/45 |
| 4,934,638 A * | 6/1990 | Davis | 248/164 |
| 5,287,576 A * | 2/1994 | Fraser | 5/637 |
| 5,520,623 A * | 5/1996 | Williams | 602/17 |
| 6,029,599 A * | 2/2000 | Hiltner, Jr. | 116/173 |
| 6,135,557 A * | 10/2000 | Gustafsson | 297/344.18 |
| 6,161,808 A * | 12/2000 | East et al. | 248/175 |
| 6,182,650 B1 * | 2/2001 | Tuttle | 126/30 |
| 6,594,839 B1 | 7/2003 | Papay | |
| 7,117,551 B1 * | 10/2006 | Dinkler et al. | 5/637 |
| 7,243,888 B2 | 7/2007 | Peek | |
| 8,136,786 B2 * | 3/2012 | Kepes et al. | 248/465.1 |
| 8,336,142 B1 * | 12/2012 | See et al. | 5/634 |
| 8,418,982 B1 * | 4/2013 | Vatus | 248/431 |
| 2004/0051009 A1 * | 3/2004 | Chen | 248/163.1 |
| 2004/0262466 A1 * | 12/2004 | Blattner | 248/166 |
| 2005/0049486 A1 | 3/2005 | Urquhart | |

OTHER PUBLICATIONS

Black Bear Haversack Trading Post website, Dec. 17, 2010, pages: http://www.black-bear-haversack.com/index.php/cPath/315_967.
John Norris of Penrith website, Dec. 17, 2010, pages: http://www.johnnorris.co.uk/shop/ty_310-shooting-stickschairs/8676-field-tripod-stool-5475.html.

(Continued)

*Primary Examiner* — Terrell McKinnon
*Assistant Examiner* — Monica Millner
(74) *Attorney, Agent, or Firm* — Marshall, Gerstein & Borun LLP

(57) ABSTRACT

A stand for supporting an object, for example a human cranium, includes a base, rods, and a pivotal joint. The base contains a plurality of stabilizers, a plurality of mounting blocks, and a means for connecting said stabilizers to said mounting blocks. The rods connect to the base at one end and contact the supported object at the other end. The rods are bound together by a fastener at a point between the base and the supported object.

5 Claims, 7 Drawing Sheets

(56) References Cited

OTHER PUBLICATIONS wellpromo.com website, Dec. 17, 2010, pages: http://www.wellpromo.com/Themes/Fishing_35.htm.
dolphinmusic.co.uk website, Dec. 17, 2010, pages: http://www.dolphinmusic.co.uk/product/6281-genelec-floor-stand-k-m-26740-for-8030a-and-8130a-requires-8030-408-st.html.
Hisandher.com website, Dec. 17, 2010, pages: http://www.hisandher.com/Stand_Tripod-c-list.aspx http://www.hisandher.com/Gloria_Head_Holder-list.aspx.
Artestuff.com website, Dec. 17, 2010, pages: http://www.artestuff.com/product_info.php?products_id=437 http://www.artestuff.com/product_info.php?products_id=441 http://www.artestuff.com/product_info.php?products_id=750 http://www.artestuff.com/product_info.php?products_id=748.
Photographers Direct website, Dec. 17, 2010, pages: http://www.photographersdirect.com/buyers/stockphoto.asp?imageid=1187808.
Portland Indy Media website, Dec. 17, 2010, pages: http://media.portland.indymedia.org/images/2005/03/314527.jpg.
Girl Souts of Palo Alto, CA website, Dec. 17, 2010, pages: http://www.girlscoutsofpaloalto.org/lashing.html.
Assiniboine Tipis website, Dec. 17, 2010, pages: http://www.assiniboinetipis.com/access.html.
B&H Video website, Dec. 17, 2010, pages: http://www.bhphotovideo.com/find/newsLetter/Friction-Free-Stabilizing.jsp.
Cabelas website, Dec. 17, 2010, pages: http://www.cabelas.com/shooting-sticks-bipods-stoney-point-tripod-rear-support-1.shtml.
Vesna Kozelj website, Dec. 17, 2010, pages: http://vesnakozelj.com/photography/equipment/supporting-the-camera-tripod-2.
Hillcreek Fiber Studio website, Dec. 17, 2010, pages: http://www.hillcreekfiberstudio.com/SpriggsAdjustableFrameLms.html.
Mistymountainfarm.com website, Dec. 17, 2010, pages: http://www.mistymountainfarm.com/triangleloompage.htm.

* cited by examiner

CRANIUM STAND

BACKGROUND

Previously anthropologists had difficulty digitizing crania in three dimensions for various reasons. One such reason I encountered was that structures holding a cranium in place obstructed the ability to view, manipulate, and collect digital and surface data from the entire external surface of the cranium at one time. Another problem that I encountered in the art was that a stand for holding the cranium often was made for one size of crania and could not easily be adjusted to hold a larger or smaller cranium of various species. Another problem that I encountered in the art was that stands were often wobbly and would not hold the cranium in its precise position because the stand did not hold the legs securely in place. Another problem that I encountered in the art was that most stands were not easily movable.

Several advantages of one or more aspects of my invention are to provide the ability to view, manipulate, and collect data from the entire external surface of a cranium. Other advantages of one or more aspects are to provide a stand that can adjust to hold different sized crania. Other advantages of one or more aspects are to provide the ability to hold the cranium in its precise position. Other advantages of one or more aspects are to provide easy setup and mobility for the stand. These and other advantages of one or more aspects will become apparent from a consideration of the ensuing description and accompanying drawings.

SUMMARY

In accordance with one embodiment, a stand comprises an adjustable base, three rods, and a pivotal joint.

DETAILED DESCRIPTION OF PREFERRED AND ALTERNATE EMBODIMENTS

Figure 1A:
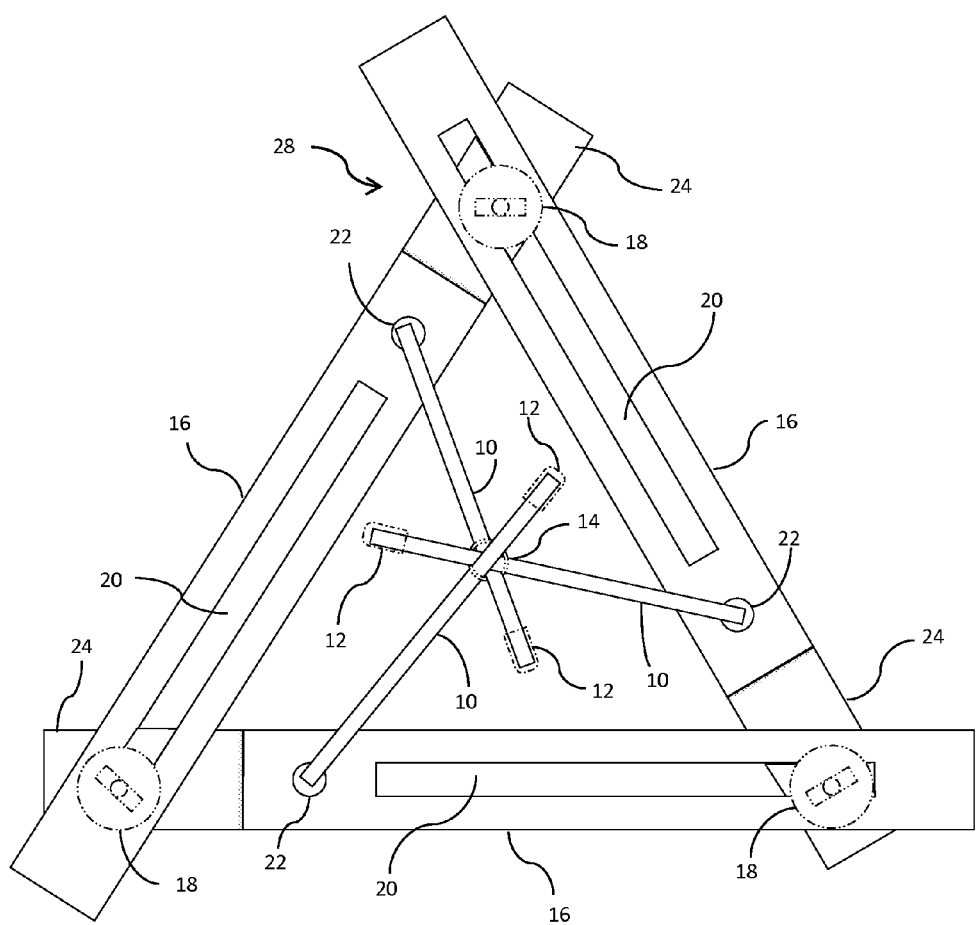
FIG. 1A is a top view of a first embodiment of my invention.
Figure 1B:
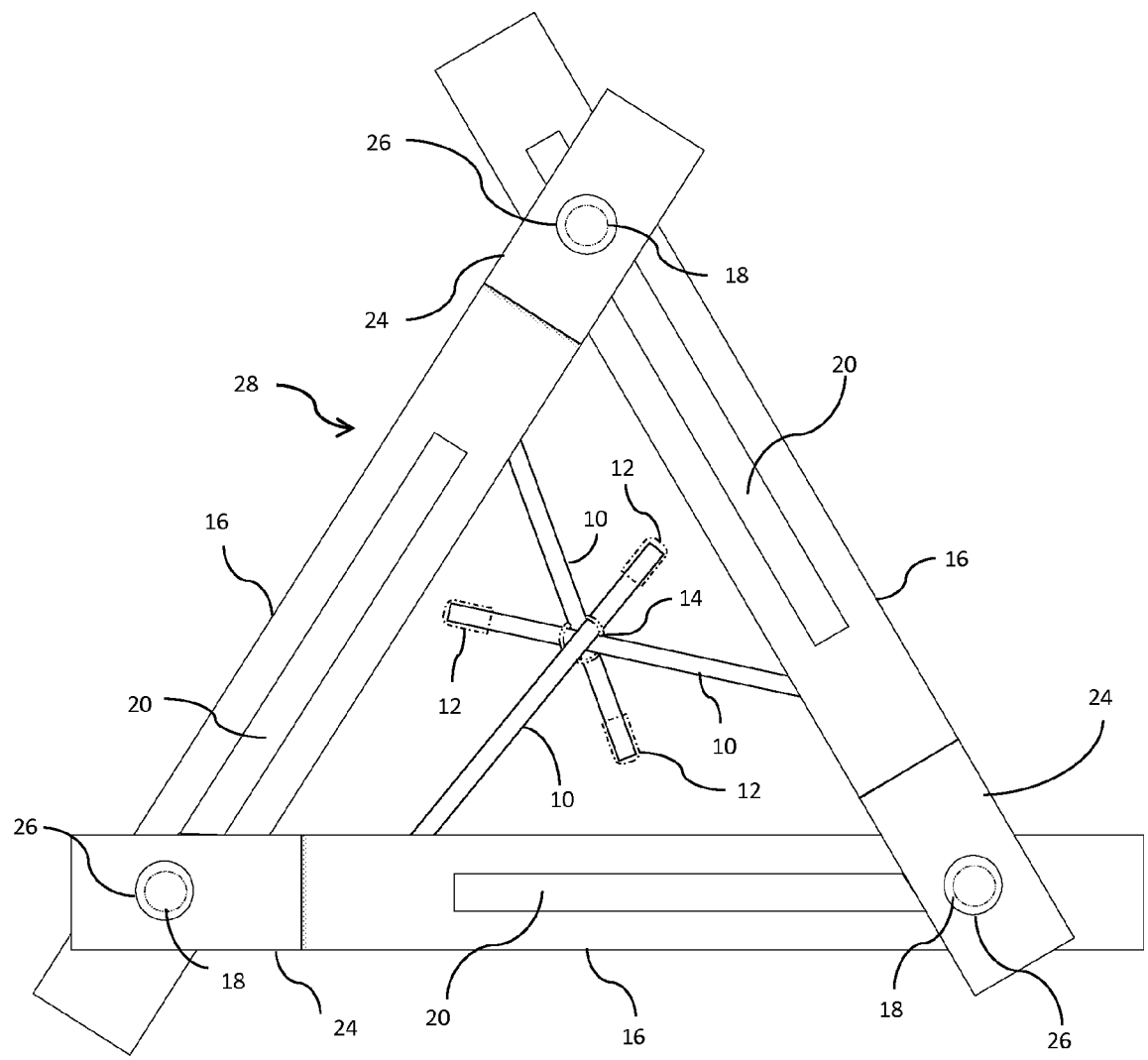
FIG. 1B is a bottom view of a first embodiment of my invention.
Figure 1C:
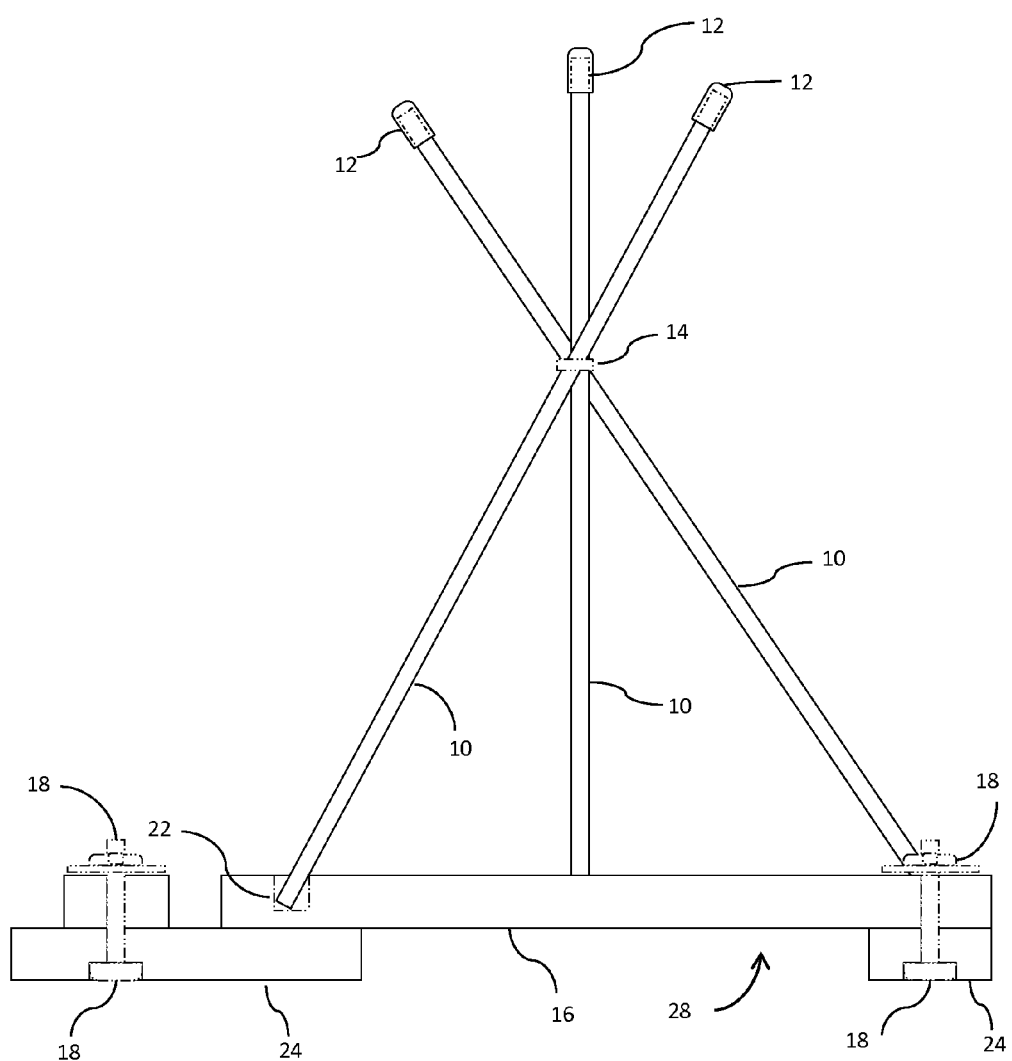
FIG. 1C is a side view of a first embodiment of my invention.
Figure 2A:
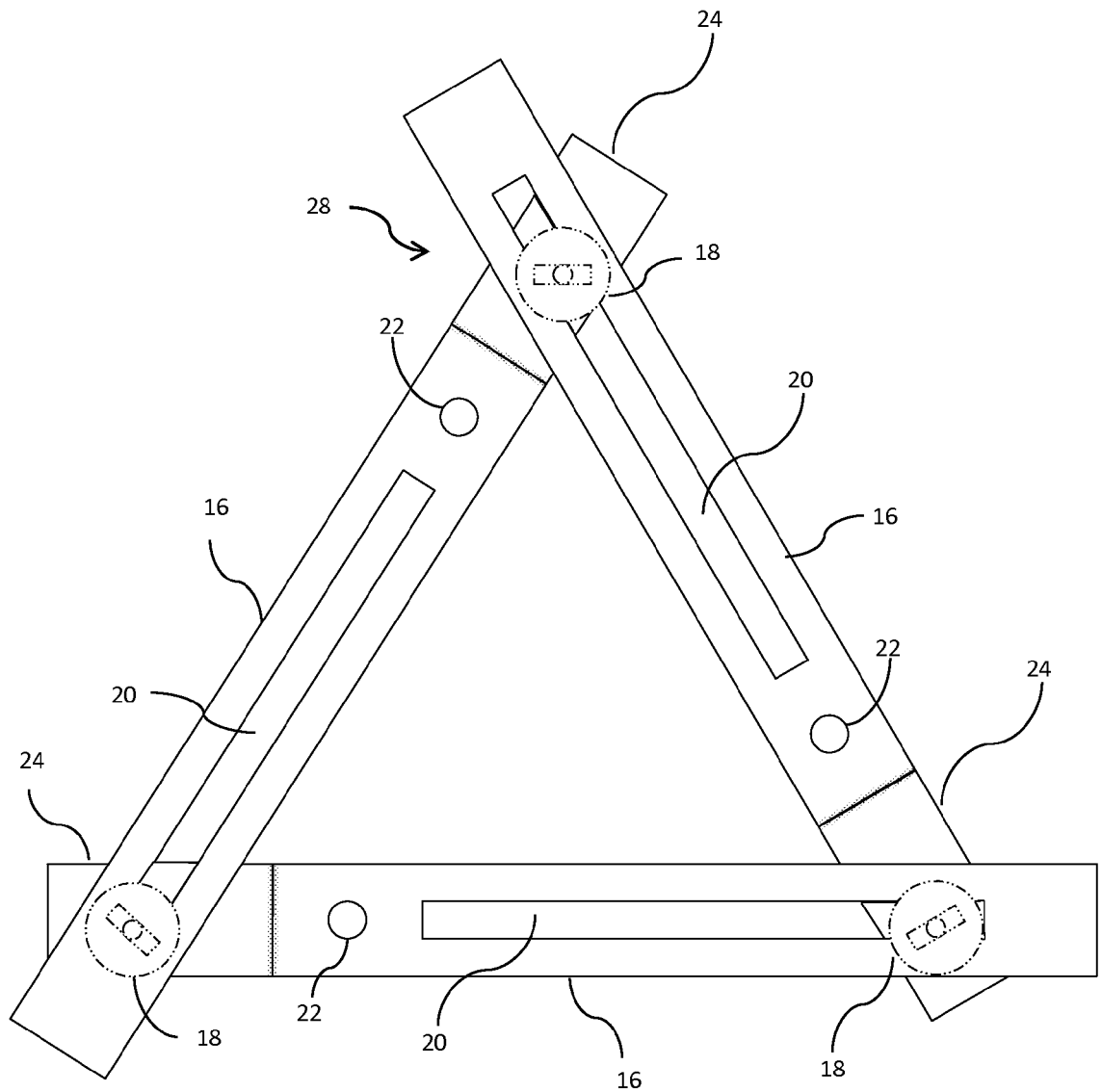
FIG. 2A is a top view of the base of an embodiment of my invention.
Figure 2B:
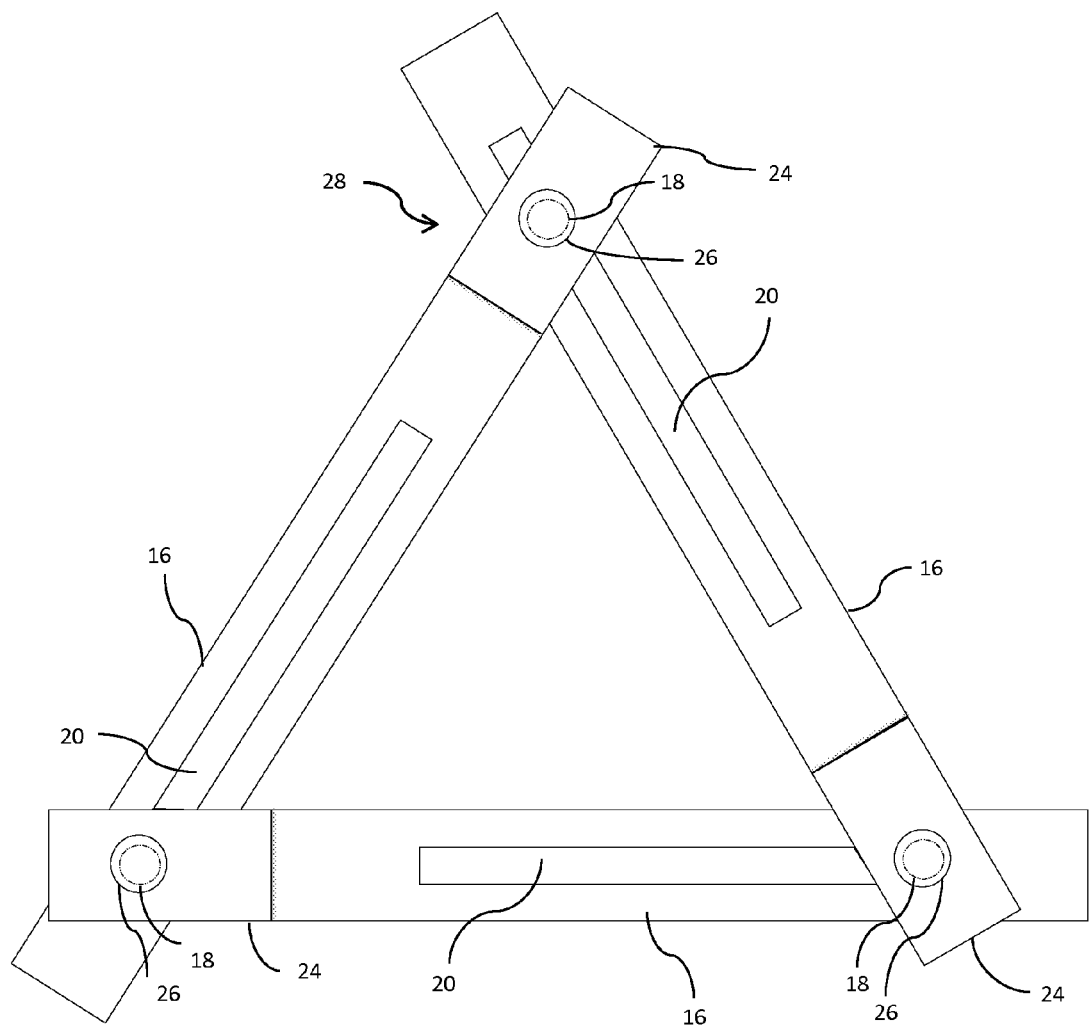
FIG. 2B is a bottom view of the base of an embodiment of my invention.
Figure 2C:
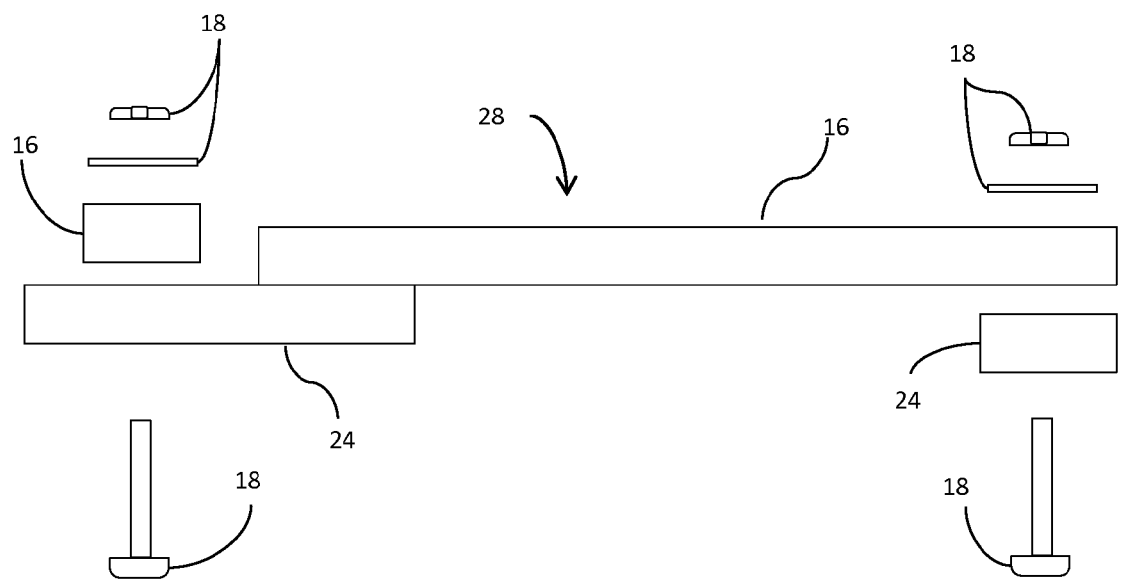
FIG. 2C is an exploded side view of the base of an embodiment of my invention.
Figure 3:
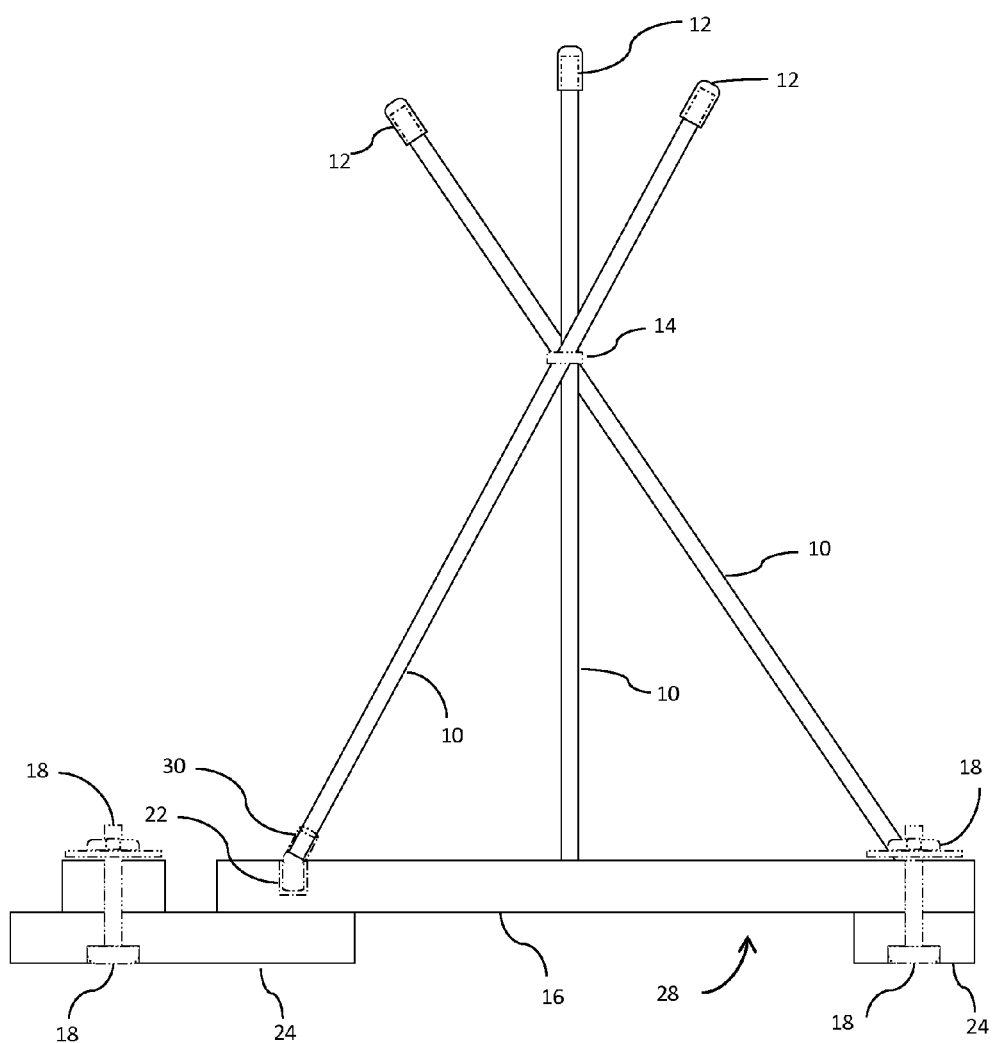
FIG. 3 is a side view of a third embodiment of my invention.

One embodiment of the stand is illustrated as FIG. 1A (top view), FIG. 1B (bottom view), and FIG. 1C (side view). The stand has at least three rods, poles, or sticks 10. In one embodiment, each rod is metal. However, the rod 10 can include a variety of materials such as metal, plastic, wood, or glass. One end of each rod rests in a corresponding groove 22 in each stabilizer 16. The opposite end of each rod 10 holds the object.

At a point between the base end and the object end of the rods 10, a pivotal joint 14 binds or pinches the rods 10 together. In one embodiment, the pivotal joint 14 is a rubber band. However, the pivotal joint 14 can include of a variety of fasteners known in the art such as a metal, plastic, or rubber ring, tape, string, or twist-tie. The portion of the rods 10 below the pivotal joint 14 is the "lower end" and the portion of the rods 10 above the pivotal joint 14 is the "upper end." The position of the pivotal joint 14 in relation to the ends of the rods 10 may vary. For example, if the held object is large, the pivotal joint 14 may be closer to the base, and thus the length of lower end of the rod 10 is shorter than the length of the upper end of the rod 10. Conversely, if the held object is small, the pivotal joint 14 may be closer to the object end of each rod 10, and thus the length of lower end of the rod 10 is longer than the length of the upper end of the rod 10.

Optionally, each rod 10 may have a rubber tip or other substance 12 on its upper end.

The supported object, for example a cranium (not pictured), contains a hollow cavity. The upper ends of the rods 10, or tip 12, support the object by contacting the concave surface of the inside of the cranium. In the example of a cranium, the rods are inserted through a smaller orifice, the foramen magnum, and upon entry are expanded to support the cranium through contact with the superior endocranial surface, specifically, the frontal and parietal bones. Thus, the external surface of the cranium is unobstructed.

One purpose of the base 28 is to stabilize the rods 10. The base 26 may be adjusted to accommodate larger or smaller crania of various species. The base 28 permits the user to adjust the position of the rods 10 or to lock the position of the rods 10 in the desired position. The base 28 contains at least three or more stabilizers 16. The stabilizers 16 preferably are rectangular. Each stabilizer 16 has a slot 20 that extends for a portion of the length of the stabilizer 16. The stabilizer 16 contains a groove 22 located between the end of the slot 20 and the end of the stabilizer 16. The groove 22 is adequate in size to hold the end of a rod 10.

A first mounting block 24 has a fixed connection to a first stabilizer 16, and an adjustable connection to a second stabilizer 16. The first mounting block 24 attaches to the first stabilizer 16 at the groove end of the first stabilizer 16 and to the bottom side of the first stabilizer 16. The first mounting block 24 is fixed to the first stabilizer 16.

The end of the first mounting block 24 opposite the first stabilizer 16 contains a hole 26. A fastener 18 passes through the hole 26 of the first mounting block 24 and through the slot 20 of the second stabilizer 16. In one embodiment, the fastener 18 is a threaded carriage bolt with a washer and wing nut. However, the fastener 18 can be any variety of fasteners known in the art. The fastener 18, when tightened, firmly locks the first and second stabilizers 16 in place in relation to each other. Each rod 10 is connected to a stabilizer 16, thus when a stabilizer 16 is locked into place, the position of the end of the corresponding rod 10 is locked. However, when the user loosens the fastener 18, the user is able to adjust the position of the first and second stabilizers 16, and thus the position of the corresponding rods 10, into the user's preferred position.

A second mounting block 24 has a fixed connection to a second stabilizer 16, and an adjustable connection to a third stabilizer 16. The second mounting block 24 attaches to the second stabilizer 16 at the groove end of the second stabilizer 16 and to the bottom side of the second stabilizer 16. The second mounting block 24 is fixed to the second stabilizer 16.

The end of the second mounting block 24 opposite the second stabilizer 16 contains a hole 26. A fastener 18 passes through the hole 26 of the second mounting block 24 and through the slot 20 of the third stabilizer 16. In one embodiment, the fastener 18 is a threaded carriage bolt with a washer and wing nut. However, the fastener 18 can be any variety of fasteners known in the art. The fastener 18, when tightened, firmly locks the second and third stabilizers 16 in place in relation to each other. Each rod 10 is connected to a stabilizer 16, thus when a stabilizer 16 is locked into place, the position of the end of the corresponding rod 10 is locked. However, when the user loosens the fastener 18, the user is able to adjust the position of the second and third stabilizers 16, and thus the position of the corresponding rods 10, into the user's preferred position.

A third mounting block 24 has a fixed connection to a third stabilizer 16, and an adjustable connection to the first stabilizer 16. The third mounting block 24 attaches to the third stabilizer 16 at the groove end of the third stabilizer 16 and to the bottom side of the third stabilizer 16. The third mounting block 24 is fixed to the third stabilizer 16.

The end of the third mounting block 24 opposite the third stabilizer 16 contains a hole 26. A fastener 18 passes through the hole 26 of the third mounting block 24 and through the slot 20 of the first stabilizer 16. In one embodiment, the fastener 18 is a threaded carriage bolt with a washer and wing nut. However, the fastener 18 can be any variety of fasteners known in the art. The fastener 18, when tightened, firmly locks the third and first stabilizers 16 in place in relation to each other. Each rod 10 is connected to a stabilizer 16, thus when a stabilizer 16 is locked into place, the position of end of the corresponding rod 10 is locked. However, when the user loosens the fastener 18, the user is able to adjust the position of the third and first stabilizers 16, and thus the position of the corresponding rods 10 into the user's preferred position.

In another embodiment of my invention, four stabilizers and four mounting blocks connect together in substantially the same way that the three stabilizers of the first embodiment are connected. The four stabilizers hold up to four rods.

In yet another embodiment of my invention, five stabilizers and five mounting blocks connect together in substantially the same way that the three stabilizers of the first embodiment are connected. The five stabilizers hold up to five rods.

In yet another embodiment of my invention, the mounting block and the stabilizer are made from a single piece of material.

In yet another embodiment of my invention the lower end of each rod 10 is inserted into a flexible rod insert 30. The insert 30 rests in the groove 22.

CONCLUSION, RAMIFICATIONS, AND SCOPE

Accordingly, the reader will see that, according to one embodiment of the invention, I have provided a stand that provides the ability to view the entire external surface of a cranium. In addition, the stand can be easily adjusted to hold different size crania, and hold the cranium in a precise position. In addition, the stand is easily movable.

While the above description contains many specificities, these should not be construed as limitations on the scope of any embodiment, but as exemplifications of various embodiments thereof. Many other ramifications and variations are possible within the teachings of the various embodiments. For example, the stabilizer can be rectangular, oblong, etc; the held object can be a cranium, a bowl, etc; the number of stabilizers and rods can be six, seven, eight, or more; the mounting block and stabilizer can be created from a single piece of material or multiple pieces of a material.

Thus the scope should be determined by the appended claims and their legal equivalents, and not by the examples given.

I claim:
1. A stand, comprising:
a. a base, wherein said base contains (1) a first, second, and third stabilizer each of which has a groove and a slot; (2) a first, second, and third mounting block each of which has a hole; and (3) a first, second, and third fastener;
   wherein said first stabilizer attaches to said first mounting block, said first fastener passes through said hole of said first mounting block and through said slot of said second stabilizer, said second stabilizer attaches to said second mounting block, said second fastener passes through said hole of said second mounting block and through said slot of said third stabilizer, said third stabilizer attaches to said third mounting block, said third fastener passes through said hole of said third mounting block and through said slot of said first stabilizer; and
b. a first, second, and third rod, wherein a first end of said first rod contacts said groove of said first stabilizer, a first end of said second rod contacts said groove of said second stabilizer, a first end of said third rod contacts said groove of said third stabilizer; and
c. a pivotal joint, wherein said pivotal joint holds said first, second, and third rods together.

2. A stand comprising:
a. a base wherein said base contains at least three stabilizers each of which has a groove and a slot, at least three mounting blocks each of which contains a hole, and at least three fasteners,
   wherein each of said at least three mounting blocks has a fixed connection to one of said at least three stabilizers and is connected through the hole by one of said at least three fasteners and in the slot of a different one of said at least three stabilizers; and
b. at least three rods, wherein each of the at least three rods mounted in said groove of a different one of said at least three stabilizers using a flexible rod insert; and
c. at least one pivotal joint wherein said pivotal joint binds said at least three rods together at a location between a first end of said at least three rods and a second end of said at least three rods.

3. A stand comprising:
a. a base wherein said base contains at least three stabilizers each of which has a groove and a slot, at least three mounting blocks each of which contains a hole, and at least three fasteners,
   wherein each of said at least three mounting blocks has a fixed connection to one of said at least three stabilizers and is connected through the hole by one of said at least three fasteners and in the slot of a different one of said at least three stabilizers; and
b. at least three rods, wherein each of said at least three rods has a first end and a second end with said first end mounted in said groove of a different one of the at least three stabilizers and each of said rods has a tip on its second end; and
c. at least one pivotal joint wherein said pivotal joint binds said at least three rods together at a location between a first end of said at least three rods and a second end of said at least three rods.

4. The stand of claim 1, wherein said first rod contacts said groove of said first stabilizer via a first flexible rod insert, said second rod contacts said groove of said second stabilizer via a second flexible rod insert, and said third rod contacts said groove of said third stabilizer via a third flexible rod insert.

5. The stand of claim 1, wherein each of said first, second, and third rods has a first end and a second end with said first end adjacent the stabilizer and each of said rods has a tip on its second end.

* * * * *